W. H. SUTTON.
PLOW.

No. 178,087.

Patented May 30, 1876.

WITNESSES:
Francis McArdle,
John Goethals

INVENTOR:
Wm H. Sutton
BY
[signature]
ATTORNEYS.

N. PETERS, PHOTO-LITHOGRAPHER, WASHINGTON, D. C.

UNITED STATES PATENT OFFICE.

WILLIAM H. SUTTON, OF PURDY, TENNESSEE, ASSIGNOR TO HIMSELF AND ISAAC W. NASH, OF SAME PLACE.

IMPROVEMENT IN PLOWS.

Specification forming part of Letters Patent No. 178,087, dated May 30, 1876; application filed April 18, 1876.

*To all whom it may concern:*

Figure 1:
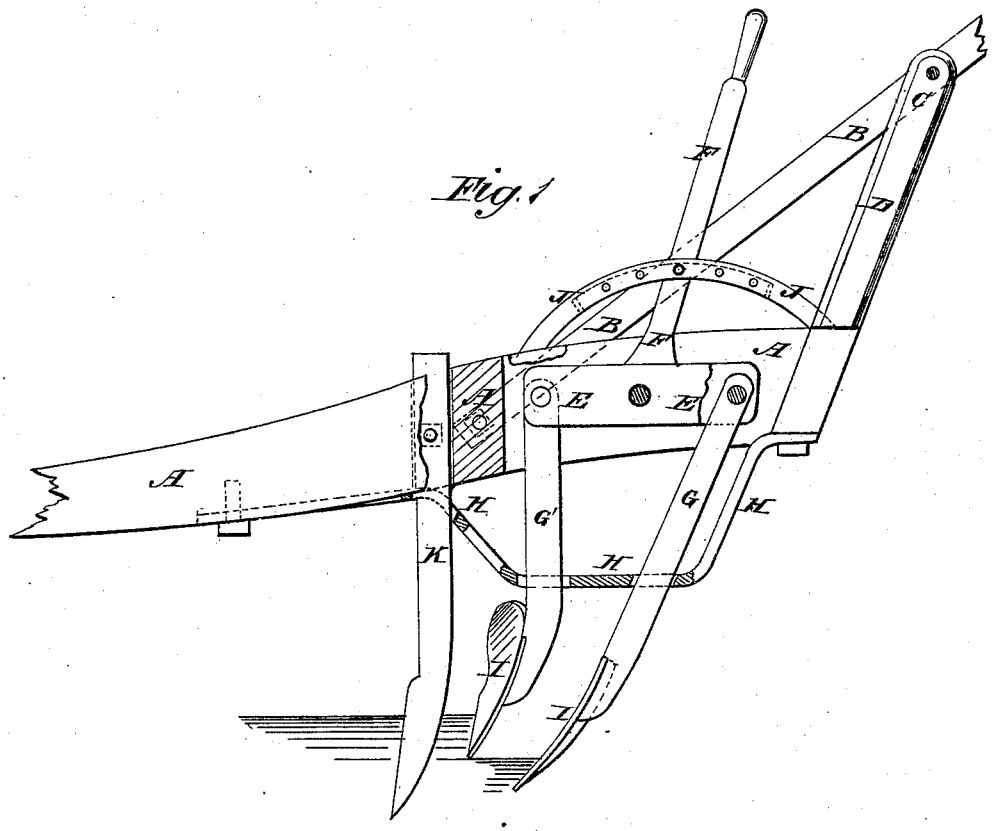
Figure 2:
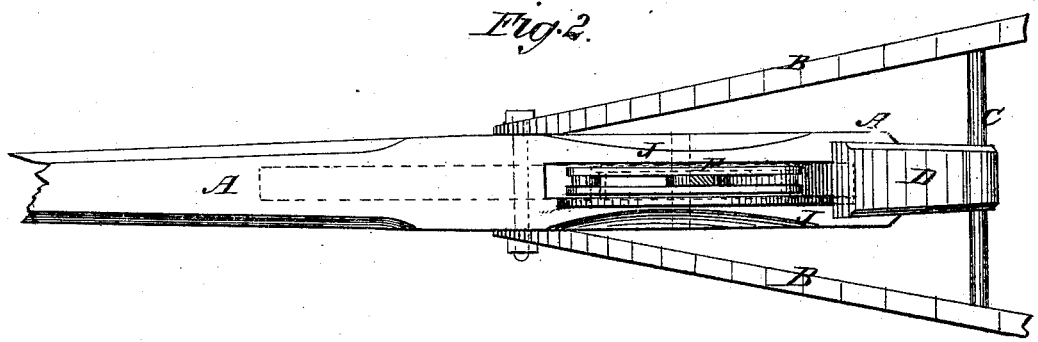

Be it known that I, WILLIAM H. SUTTON, of Purdy, in the county of McNairy and State of Tennessee, have invented a new and useful Improvement in Reversible Subsoil and Cultivating Plows, of which the following is a specification:

Figure 1 is a side view of my improved plow, partly in section to show the construction. Fig. 2 is a top view of the same.

Similar letters of reference indicate corresponding parts.

The object of this invention is to furnish an improved plow which shall be so constructed that it may be adjusted for use as a reversible or hill-side plow, as a turning and subsoil plow, as a plow for cultivating the plants and breaking up the middle between the rows, and as a ditching-plow, as may be required.

The invention consists in the combination of the pivoted bar, the lever, and the supporting-bar with the plow-standards and the beam.

A is the plow-beam, to the middle part of which are attached the forward ends of the handles B. The handles B are attached to the ends of a round, C, which passes through and is attached to the upper end of the standard D. The lower end of the standard D is attached to the rear end of the beam A. The rear part of the beam A is slotted to receive the bar E, which is pivoted at its center to the said beam A. To the middle part of the bar E is rigidly attached, or upon it is formed, a lever, F. To the ends of the bar E are pivoted the upper ends of the two standards G, the middle parts of which pass down through holes in the bar H. The ends of the bar H are bent upward, and are securely attached to the under side of the beam A. The bar H supports the draft-strain upon the standards G. To the lower ends of the standards G are attached the plows I.

By this construction either plow I may be lowered into, and the other raised out of, a working position, or both may be held in working position at the same time, by means of the lever F, which is held in any position into which it may be adjusted by a pin, which passes through it and through one or the other of the holes in the curved bars J, between which the lever F moves, and the ends of which are attached to the beam A.

When used for a reversible or side-hill plow, a right-hand plow is attached to one standard G and a left-hand plow to the other standard, and they are lowered into working position alternately.

For ditching, both plows are held in working position at the same time.

For cultivating plants, a turn-plow may be attached to one standard and a bull-tongue to the other, the bull-tongue being used close to the plants and the large plow for breaking up the middle.

For subsoiling, an ordinary plow may be attached to the forward standard and a subsoil-plow to the other standard. The lever F is then adjusted to cause the subsoil-plow to work at any desired depth below the other plow.

Any kind of plows may be attached to the standards G, as the kind of plowing to be done may require.

To the beam A, in front of the forward standard G, is attached a colter, K, to cut off any roots that might obstruct the plows.

Having thus described my invention, what I claim as new, and desire to secure by Letters Patent, is—

The combination of the pivoted bar E, the lever F, and the supporting-bar H with the plow-standards G and the beam A, substantially as herein shown and described.

WILLIAM H. SUTTON.

Witnesses:
J. P. PRINCE,
JOHN W. STUMPH.